US012693783B2

(12) United States Patent
Zitlaw et al.

(10) Patent No.: US 12,693,783 B2
(45) Date of Patent: Jul. 28, 2026

(54) METHODS, DEVICES AND SYSTEMS FOR SERIAL BUS OPERATIONS

(71) Applicant: Infineon Technologies LLC, San Jose, CA (US)

(72) Inventors: Clifford Zitlaw, San Jose, CA (US); Stephan Rosner, Campbell, CA (US)

(73) Assignee: Infineon Technologies LLC, San Jose, CA (US)

( * ) Notice: Subject to any disclaimer, the term of this patent is extended or adjusted under 35 U.S.C. 154(b) by 23 days.

(21) Appl. No.: 18/750,629

(22) Filed: Jun. 21, 2024

(65) Prior Publication Data

US 2025/0390221 A1 Dec. 25, 2025

(51) Int. Cl.
*G06F 3/06* (2006.01)

(52) U.S. Cl.
CPC .......... *G06F 3/0611* (2013.01); *G06F 3/0629* (2013.01); *G06F 3/0673* (2013.01)

(58) Field of Classification Search
CPC ..... G06F 3/0611; G06F 3/0629; G06F 3/0673
See application file for complete search history.

(56) References Cited

U.S. PATENT DOCUMENTS 10,146,711 B2 12/2018 Nale et al.
10,216,685 B1 * 2/2019 Sartore ............... G06F 12/1009

10,932,358 B2 2/2021 Ho et al.
2012/0063243 A1 * 3/2012 Hasan ................... G11C 29/022
365/233.11
2021/0349839 A1 * 11/2021 Betser ................. G06F 13/1668
2025/0165147 A1 * 5/2025 Avanindra ............ G06F 3/0659

FOREIGN PATENT DOCUMENTS

CN 113900580 A * 1/2022 ........... G06F 3/0673

OTHER PUBLICATIONS

Translation of CN-113900580-A (Year: 2022).*
International Search Report and Written Opinion of the International Searching Authority for International Application No. PCT/US25/34035 dated Aug. 7, 2025; 8 pages.

* cited by examiner

*Primary Examiner* — Zhuo H Li

(57) ABSTRACT

A method can include detecting an active chip select (CS) signal at a CS input of a memory device. Following an active CS signal, a first read instruction and a first address can be received in synchronism with a serial clock at a plurality of serial input/output (SIOs) of the memory device to initiate a first read access. Operation information can be received on at least one control (CA) input after the first read instruction and first address. In response to such operation information, a second read access can be initiated to the memory device. First read data corresponding to the first read access can be driven on the SIOs followed by second read data corresponding to the second read access. Additional follow-on read accesses can be continued with additional operation information on CA input. Corresponding devices and systems are also disclosed.

20 Claims, 15 Drawing Sheets

| CA0[47:40] | CA0[39:32] | CA1[31:24] | CA1[23:16] | CA2[15:8] | CA2[7:0] |
|---|---|---|---|---|---|
| CMD | ADD | ADD | ADD | | |
| CMD | ADD | ADD | ADD | | |
| CMD | ADD | ADD | ADD | | |
| ADD | ADD | ADD | ADD | | |
| ADD | ADD | ADD | ADD | | |
| ADD | ADD | ADD | ADD | ADD | ADD |
| ADD | ADD | ADD | ADD | ADD | ADD |

1040 — CA INPUT(s) ACTIVE

FIG. 10

| INSTRUCTION VALUE CK EDGE HI | INSTRUCTION VALUE CK EDGE LO | |
|---|---|---|
| XX | XX | DISREGARD CA INPUT(s) |
| XX | YY | CA INPUT(s) ACTIVE |

CS ACTIVE
1580-0

CS
INACTIVE?
1580-9

RX
INSTRUCTION ON SIOs?
1580-1

RX
ADDRESS ON SIOs AT DDR?
1580-2

EXECUTE
OPERATION
INDICATED BY
INSTRUCTION
1580-3

INSTRUCTION=READ?
1580-4

ADDRESS FROM IOs =
CURRENT ADDRESS
1580-5

EXECUTE READ OP
AT CURRENT ADDRESS
1580-6

RX
ADDRESS ON CA(s) AT DDR?
1580-7

ADDRESS FROM CA(s) =
CURRENT ADDRESS
1580-8

1680

(BACKGROUND)

(BACKGROUND)

(BACKGROUND)

(BACKGROUND)

METHODS, DEVICES AND SYSTEMS FOR SERIAL BUS OPERATIONS

TECHNICAL FIELD

The present disclosure relates generally to serial communications, and more particularly to serial communications for controlling accesses to memory devices.

BACKGROUND

FIG. 20-0 is a timing diagram showing a read transaction for a system that restricts operations according to a chip select (CS) signal. FIG. 20-0 includes waveforms for a chip select signal CS #, serial clock CK and serial input/outputs (IOs) IO[7:0].

Prior to time to, CS #can transition active, starting a read transaction. At time t0, a read instruction (C) can be received followed by address values (A). Such values (C and A) can be received in synchronism with CK. At time t1, a last address value can be received. CS #can remain active, restricting operations to the read access.

Following a read latency (RL) from time t1 to t2, target read data (D0 to d31) can be output on IO[7:0] (the same IOs on which command and address data were received). Target read data can be output at a double data rate (i.e., on rising and falling edges of CK). At time t3, the read transaction can be concluded with CS #returning to an inactive state.

Referring still to FIG. 20-0, it is understood that any new transaction following the read transaction would have to completely restart from scratch, having to de-assert and then once again reassert CS #active, and provide a new instruction-address (C and A) pair before new target read data would be transferred once again on IO[7:0].

FIG. 20-1 shows a host device 2001-0 that can issue memory access requests to a memory device. A host device 2001-0 can include one central processing unit (CPU) 2003 and a Serial Peripheral Interface (SPI) controller 2005. A CPU 2003 can communicate memory requests to SPI controller 2005. SPI controller 2005 can generate serial data signals on a serial bus to access a memory device (not shown). SPI controller 2005 can manage most applications, as it typically serves a single requesting process (i.e., CPU 2003).

FIG. 20-2 shows another host device 2001-1. A host device 2001-1 can include multiple CPUs 2003-0 to 2003-7 connected to a SPI controller 2005. Multiple CPUs (2003-0 to -7) can provide greater functionality, enabling multiple processes or threads to run on the same host device 2001-1. Such increased processes/threads can result in a greater number of random memory access requests.

For some applications, increased random access memory operations can result in reduced overall random access bandwidth. One such application can be execute-in-place (XiP) systems, where a processor (e.g., CPU) can execute code directly from a nonvolatile memory device, such as a NOR type flash memory. While random access speeds can be increased by utilizing other memory types, such as static random access memory (SRAM) or dynamic RAM (DRAM), such memories are volatile and thus not suitable for reliability or safety reasons. While volatile memories can be deployed as "shadow" RAM, storing a copy of data (e.g., code) stored in a corresponding nonvolatile memory and thus increasing access speed, shadow RAM can result in increased system cost and complexity.

FIG. 20-3 is a diagram showing a SPI interface 2007 of a memory device. SPI interface 2007 can be connected to an SPI controller by a SPI bus system 2009. The SPI interface 2007 can be an octal SPI interface that includes a chip select input (CS #), a clock input (CK), a data strobe input (DS), and multiple serial input/outputs (IO[7:0]).

It would be desirable to arrive at some way of increasing throughput for accesses to memory devices over a serial bus that control random accesses with a CS signal.

SUMMARY

A method can include detecting an active chip select (CS) signal at a CS input of a memory device. While the CS signal is active, a first read instruction and a first address can be received in synchronism with a serial clock at a plurality of serial input/output (SIOs) of the memory device to initiate a first read access. While the CS signal remains active, operation information can be received on at least one control (CA) input after the first read instruction and first address. In response to such operation information, a second read access can be initiated to the memory device. First read data corresponding to the first read access can be driven on the SIOs followed by second read data corresponding to the second read access.

BRIEF DESCRIPTION OF DRAWINGS

FIG. 1-1 is a timing diagram showing operations of a system according to embodiments.

FIGS. 2-0 and 2-1 are timing diagrams showing a random read access operation according to an embodiment.

FIGS. 4-0 and 4-1 are timing diagrams showing memory device operations with memory accesses of different types according to embodiments.

FIG. 9 is a table showing how double data rate (DDR) instruction data can be used to indicate a memory device operation that will use operation data received at a CA input.

FIG. 10 is a table showing how DDR command-address data can be used to indicate a memory device operation that will use operation data received at a CA input.

FIG. 11-0 is a block diagram of a memory device according to an embodiment.

FIG. 11-1 is a diagram of a memory device integrated circuit (IC) according to an embodiment.

FIGS. 13-0, 13-1 and 13-2 are diagrams of memory cell arrays that can be included in embodiments.

FIGS. 17-0 and 17-1 are diagrams showing memory controllers according to embodiments.

FIG. 20-0 is a timing diagram showing a conventional read access. FIGS. 20-1 to 20-3 are diagrams of a conventional host devices and a serial peripheral interface (SPI) type interface.

DETAILED DESCRIPTION

According to embodiments, a memory device can include a serial bus interface with one or more serial input/outputs (IOs). Such SIOs can receive instruction values, address values, and transfer data in synchronism with a serial clock. In addition, a memory device can include one or more control inputs, referred to herein as command-address (CA) inputs, but not necessarily including both command and/or address information. A first read transaction can be started in response to the assertion of a chip select (CS) signal and the receipt of an instruction and address on serial IOs. While the CS signal remains asserted and the first read transaction is in progress, a second read transaction can be initiated by operation information received on the CA input(s).

Execution of a memory access operation using operation information received on a CA input can include, but is not limited to, extending a current access (e.g., increasing a size of a burst access), adding a new target address (e.g., enabling faster random access), adding a new type of operation (e.g., initiating a write operation after receiving a read instruction on the serial IOs and/or a read operation after a write operation), and modifying a memory access (e.g., adding encryption, authentication or error detection/correction).

According to embodiments, operation information can be received on a CA input after instruction and address value have been received on serial IOs. In some embodiments, there can be a delay (e.g., read latency, inserted cycles) between reception of an instruction on serial IOs and corresponding data on the serial IOs. The operation information can be received on the CA input during such a delay period.

According to embodiments, a memory device that receives instruction and address values on serial IOs and operation information on CA inputs can be a nonvolatile memory (NVM) device that provides execute-in-place (XiP) code (e.g., firmware, software, read-only-memory). Operation information on CA inputs can enable random access reads to be executed sequentially, with resulting read data for such sequential reads to be output in a pipelined fashion (i.e., no or minimal delay between read data sets).

According to embodiments, instruction and address values received on serial IOs without any operation information on CA inputs can be compatible with an existing serial bus standard. Operation information received on CA inputs may not be compatible with such a standard (e.g., can provide capabilities beyond the standard). In some embodiments, such standards can include but are not limited to a Serial Peripheral Interface (SPI) standard or Hyperbus™ standard.

Figures 0, 1:
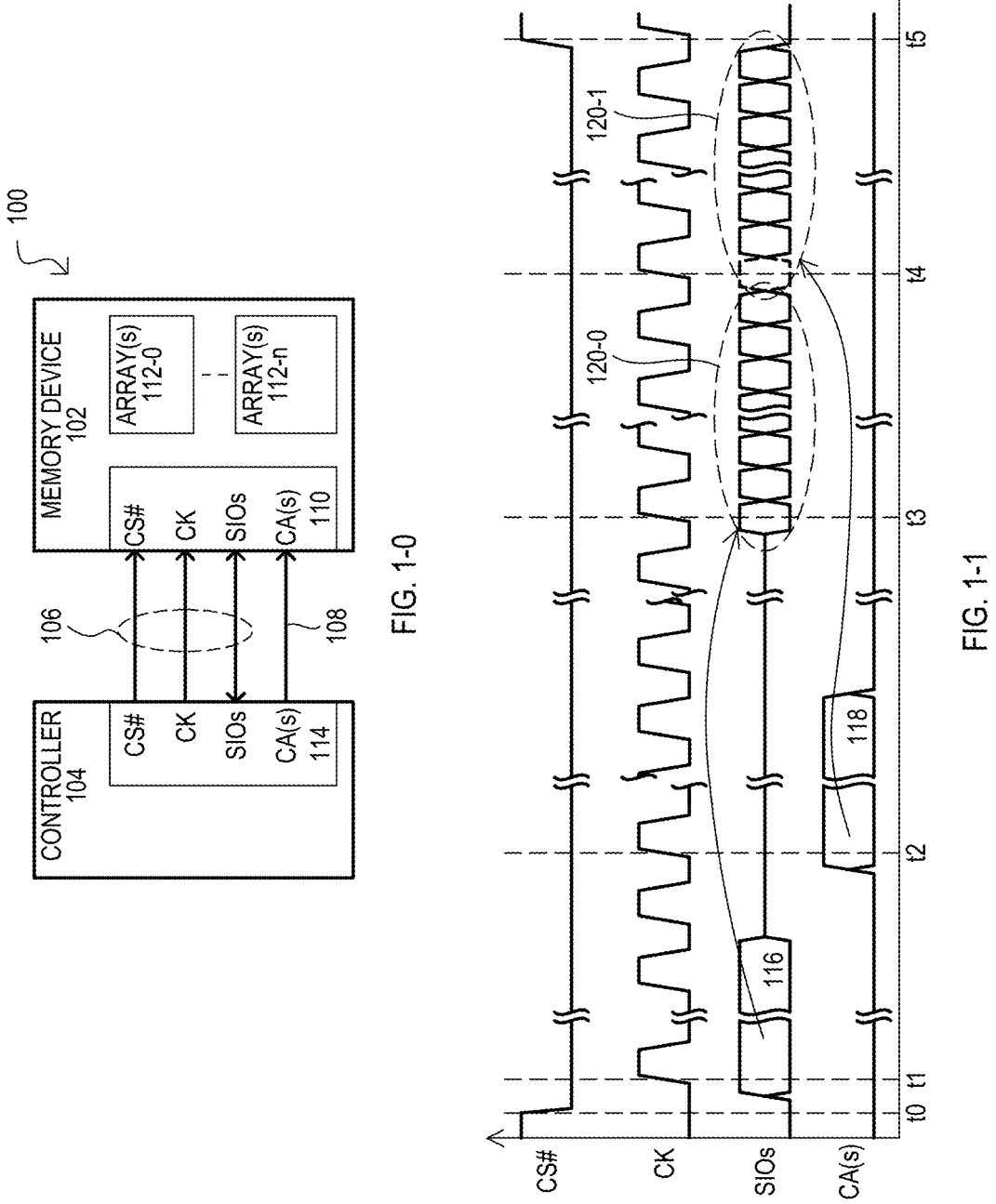
FIG. 1-0 is a block diagram of a system according to an embodiment.

FIG. 1-0 is a block diagram of a system 100 according to an embodiment. A system 100 can include a memory device 102 and a controller 104 in communication with one another over a serial bus system 106. To provide additional functionality with a relatively small change in device inputs, a system can include one or more CA lines 108. A memory device 102 can include IO circuits 110 and one or more memory cell arrays 112-0 to 112-n. IO circuits 110 can include a chip select input CS #, a serial clock input CK, multiple serial IOs (SIOs), and one or more CA inputs (CA(s)). IO circuits 110 can receive instruction and address values on SIOs, receive data on SIOs and transmit data from SIOs, where such data and values are received/transmitted according to a serial clock received at CK. Memory cell arrays (112-0 to -n) can include memory cells for storing data. Such memory cells can be of any suitable type, including nonvolatile, volatile or combinations thereof. In some embodiments, a number of CA inputs can be less than a number of SIOs.

In response to instruction (and possibly address) values received on SIOs and operation information received on CA(s), a memory device 102 can execute one or more memory accesses. In some embodiments, accesses to a memory device 102 can also be initiated in response to instruction values on SIOs without any operation information on CA(s). In some embodiments, operations of a memory device 102 initiated by instruction (and possibly address) values without operation data on CA(s) can comply with one or more standards (e.g., SPI, Hyperbus™). Operations of a memory device 102 initiated by instruction values with operation information on CA(s) can provide capabilities that expand beyond such a given standard. Such capabilities can include continuing to initiate follow-on read transactions using CA inputs, even while a first read transaction, initiated by instruction and address values on SIOs, is in progress.

A serial bus system 106 can include a CS #line, CK line, and SIO lines. In some embodiments, a serial bus system 106 can be compatible with a standard, while CA(s) line 108 may not be part of the standard.

A controller 104 can include controller IO circuits 114. Controller IO circuits 114 can include a CS #output, a CK output, SIOs and one or more CA outputs.

In this way, a system can include a memory device that receives instruction and other data over a serial bus system to execute a first memory device transaction. Follow-on memory device transactions can be initiated by operation information received by a memory device on one or more CA inputs.

FIG. 1-1 is a timing diagram showing memory device operations according to an embodiment. Such operations can be executed by a system and devices like those shown in FIG. 1-0. FIG. 1-1 shows waveforms for CS #, CK, SIOs and CA input(s).

Referring still to FIG. 1-1, at about time to, a CS #signal can transition active (go low in this case). At about time t1, instruction values and address values 116 can be received by a memory device on SIOs in synchronism with CK. Instruction and/or address values 116 can be received at single data rate (SDR) (i.e., bit values latched once per cycle), at a double data rate (DDR) (i.e., bit values latched twice per cycle), or a combination thereof (e.g., instruction values are SDR, address values are DDR).

At about time t2, operation information 118 can be received on CA(s). Operation data can be SDR, DDR or a combination thereof. Operation information can take any suitable form, including instruction bits and/or address bits, or other bit combinations the purpose of which would be understood by a memory device. Operation data can also include signaling, with a level of a CA(s) input indicating a new or next transaction, or how a transaction can be modified.

There can be some delay (e.g., latency, inserted cycles) between instruction/address values 116 and corresponding first data 120-0. Accordingly, at about time t3, in response to instruction/address values 116 on SIOs, first data 120-0 can be driven on SIOs. Such data can be read data output by a memory device. At about time t4, in response to operation information 118, second data 120-1 can be driven on SIOs. Such data can be read data output by a memory device. In the embodiment shown, first and second data 120-0/1 can be pipelined, with second data immediately following first data. In the embodiment shown, first and second data 120-0/1 can be DDR data.

In this way, after instruction and address values are received on SIOs, operation information can be received at a control input. Data corresponding to the instruction/address values can be subsequently driven on the SIOs followed by data corresponding to the operation information.

Figures 0, 1, 2:
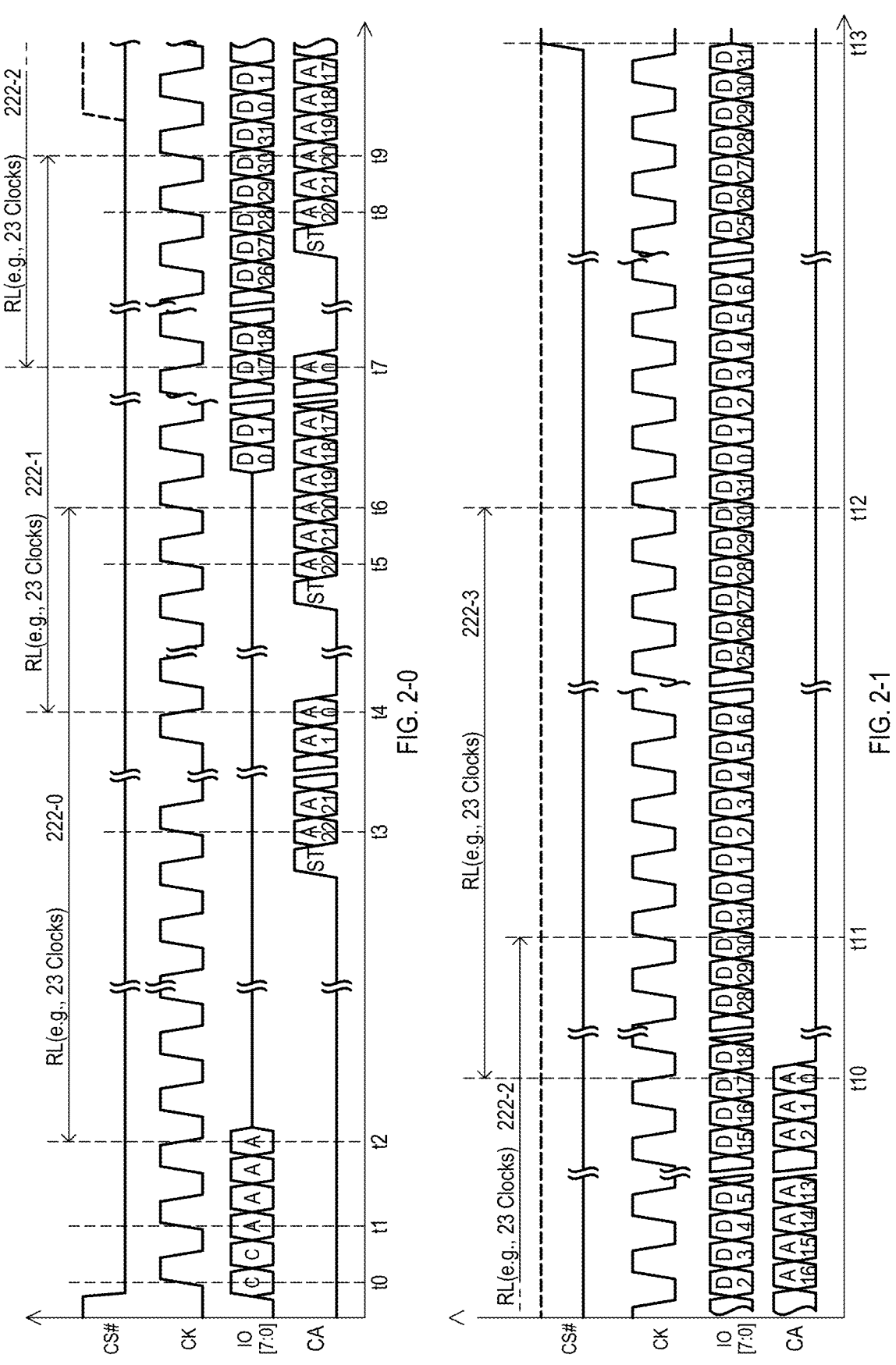

FIGS. 2-0 and 2-1 are timing diagrams showing a random read access operation according to an embodiment. FIGS. 2-0 to 2-1 include some of the same waveforms as FIG. 1-1, but with SIOs being an eight-bit IO (IO[7:0]) and CA being a one-bit input. In some embodiments, the operation shown in FIGS. 2-0/1 can occur on a memory device interface compatible with an SPI standard that further includes a CA input.

Referring to FIG. 2-0, prior to time to, a CS #signal can transition to an active state. At about time t0, in synchronism with CK, instruction values (C) can be received on IO[7:0]. At this time, a CA input can be inactive (low in this example). Instruction values (C) can indicate a read operation. In some embodiments, instruction values can be SDR, with the same instruction bits being presented in the rising and first subsequent falling edge of CK. However, alternate embodiments can include DDR instruction values, with instruction data presented on a rising clock edge being different than that presented on the subsequent falling clock edge. In some embodiments, instruction values can indicate that operation information will be received on a CA input (as opposed to operations in which no such operation data is presented).

At about time t1, following instruction values, address values can be received in IO[7:0] synchronism with CK as DDR data. At about time t2, a last set of address values can be received ending a read instruction-address value sequence. Time t2 can also start a read latency 222-0 time period between the end of a read instruction/address values and the output of corresponding read data on IO[7:0].

At about time t3, first operation information can be received on CA. In the embodiment shown, the first operation information can be address values A0 to A22. Further, receipt of address values on CA inputs can begin with CA being asserted high (shown as ST). While such address values are received one bit at a time, it is understood alternate embodiments can include more than one CA input to enable receipt of address values at a faster rate. It is understood that address values received on CA may not be sequential locations from the address values received previously on IO[7:0]. That is, address values on CA can represent a random access not tied to a previously received address. At about time t4, a last CA address value can be received, starting another RL 222-1.

At about time t5, second operation information can be received on CA, which can be another set of address values. Such address values can represent another random access not tied to a previously received address.

At about time t6, following a first RL 220-0, first read data corresponding to the address values received on IO[7:0] can be output on IO[7:0]. In the embodiment shown, such first read data can be a burst of 32 DDR bytes. However, alternate embodiments can have a longer or shorter burst length (BL) and/or SDR data.

At about time t7, a second set of CA address values can end, starting a third RL 222-2. At about time t8, a third set of CA address values can be received, which can represent another random access.

At about time t9, following a second RL 222-1, second read data corresponding to CA address values received at time t3 can be output on IO[7:0]. In the embodiment shown, first and second read data can be pipelined, with second read data immediately following first read data. In the embodiment shown, second read data can also be a burst of 32 bytes. However, alternate embodiments can have a longer or shorter BL.

Optionally, at about time t9, following the output of first read data corresponding to the initial read access corresponding to instruction and address values received on IO[7:0], CS #can return to an inactive state (i.e., high). However, in other embodiments CS #can remain active while transactions initiated by inputs to CA continue.

Referring to FIG. 2-1, a memory device operation can continue from that shown in FIG. 2-0. At about time t10, a third set of CA address values can end, starting a fourth RL 222-3. At about time t11, following a third RL 222-2, third read data corresponding to CA address values received at time t7 can be output on IO[7:0]. In the embodiments shown, such third read data can continue a pipeline of read data. At about time t12, following a fourth RL 222-3, fourth read data corresponding to CA address values received at time t8 can be output on IO[7:0], adding to the pipelined read data output.

At time t13, a CS #can transition inactive, ending the memory access operation.

In this way, a memory device can receive a memory access instruction and first address values on SIOs, and begin accessing device locations at the first address. Before such an access is complete, one or more additional addresses can be received on CA inputs, initiating accesses to such additional addresses. First addresses and additional addresses can be random accesses. Such memory device operations can occur over an SPI compatible bus with the addition or one or more CA inputs.

Figure 3:
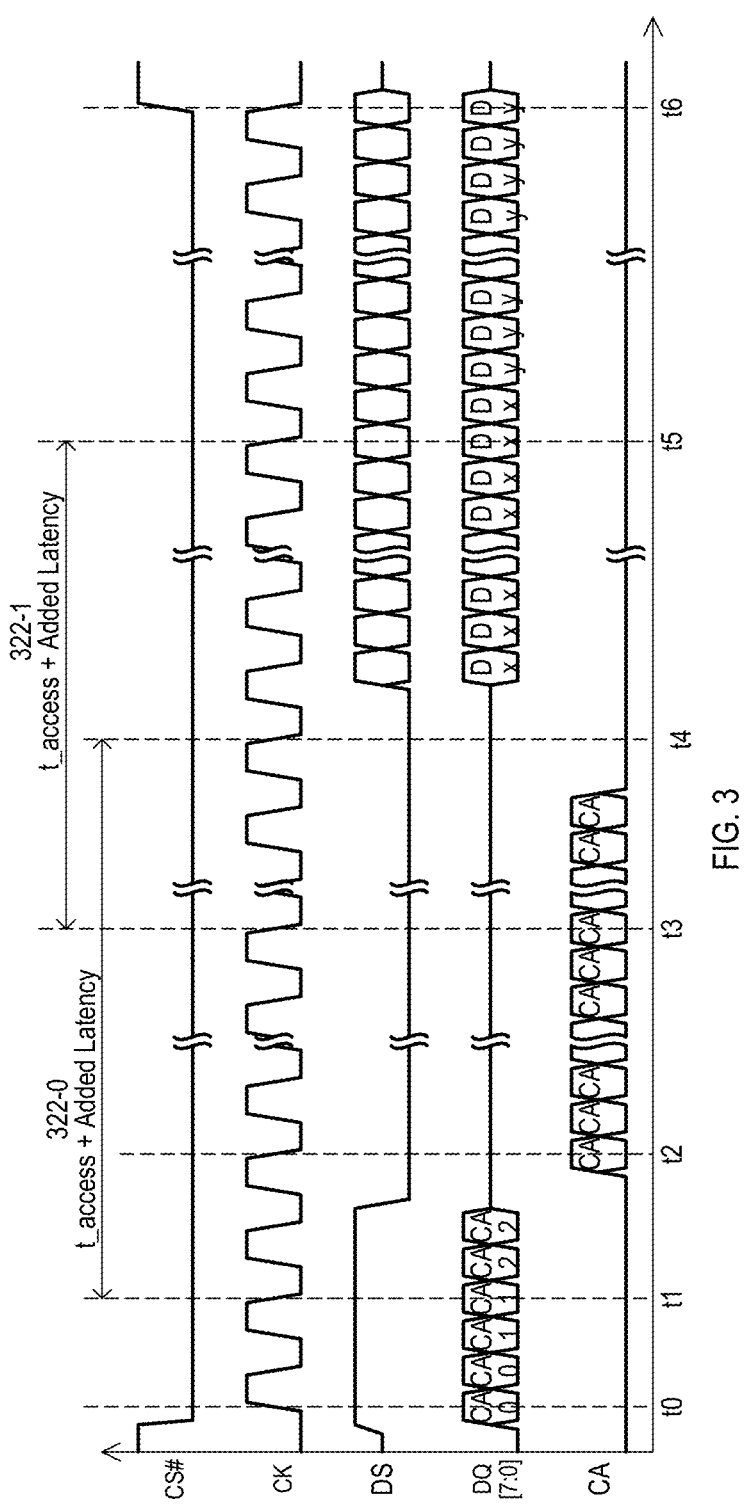
FIG. 3 is a timing diagram showing a random read access operation according to another embodiment.

FIG. 3 is a timing diagram showing a random read access operation according to another embodiment. FIG. 3 includes some of the same waveforms as FIG. 1-1, but with a data IO (DQ[7:0]), a data strobe DS, and CA being a one-bit input. A DS signal can indicate when read data are being output, when write data are being received and/or write data masking. In some embodiments, the operation shown in FIG. 3 can occur on a memory device interface compatible with a Hyperbus™ standard, that further includes a CA input.

Referring still to FIG. 3, at about time to, command and address values can be received on DQ[7:0], in six different parts (e.g., DDR). At time t1, command and initial address values can be received to initiate a memory access that will occur over a first access time (t_access) 322-0 (which may optionally include additional latency added by a controller). In some embodiments, command values can indicate the operation will include data on a CA input. In some embodiments command values received on DQ[7:0] can indicate a read or write operation.

At about time t2, operation information can be received on CA. Such operation information can take any suitable form, including but not limited to additional command values, address values, or combinations thereof. In some embodiments, operation information can indicate a read or write operation. At about time t3, a second operation can be initiated that includes a second access time 322-1.

At about time t4, following a first access time 322-0, first data (Dx) corresponding to the operation initiated at time t1 can be driven on DQ[7:0]. In the embodiment shown, such first data can be DDR data. At about time t5, following a second access time 322-1, second data (Dy) corresponding to the operation initiated at time t1 can be driven on DQ[7:0]. In the embodiment shown, second data (Dy) can be pipelined with first data (Dx).

In this way, a memory device can receive a memory access instruction and first address values on data IOs, and begin accessing device locations before all address values have been received. Before such an access is complete, additional operation information can be received on CA inputs, and a second access initiated before all CA input data has been received. Such memory device operations can occur over a Hyperbus™ compatible system with the addition or one or more CA inputs.

According to embodiments, the ability to provide additional information via one or more CA inputs can enable different types of memory accesses to occur. Examples of such embodiments are shown in FIGS. 4-0 and 4-1.

Figures 0, 1, 4:
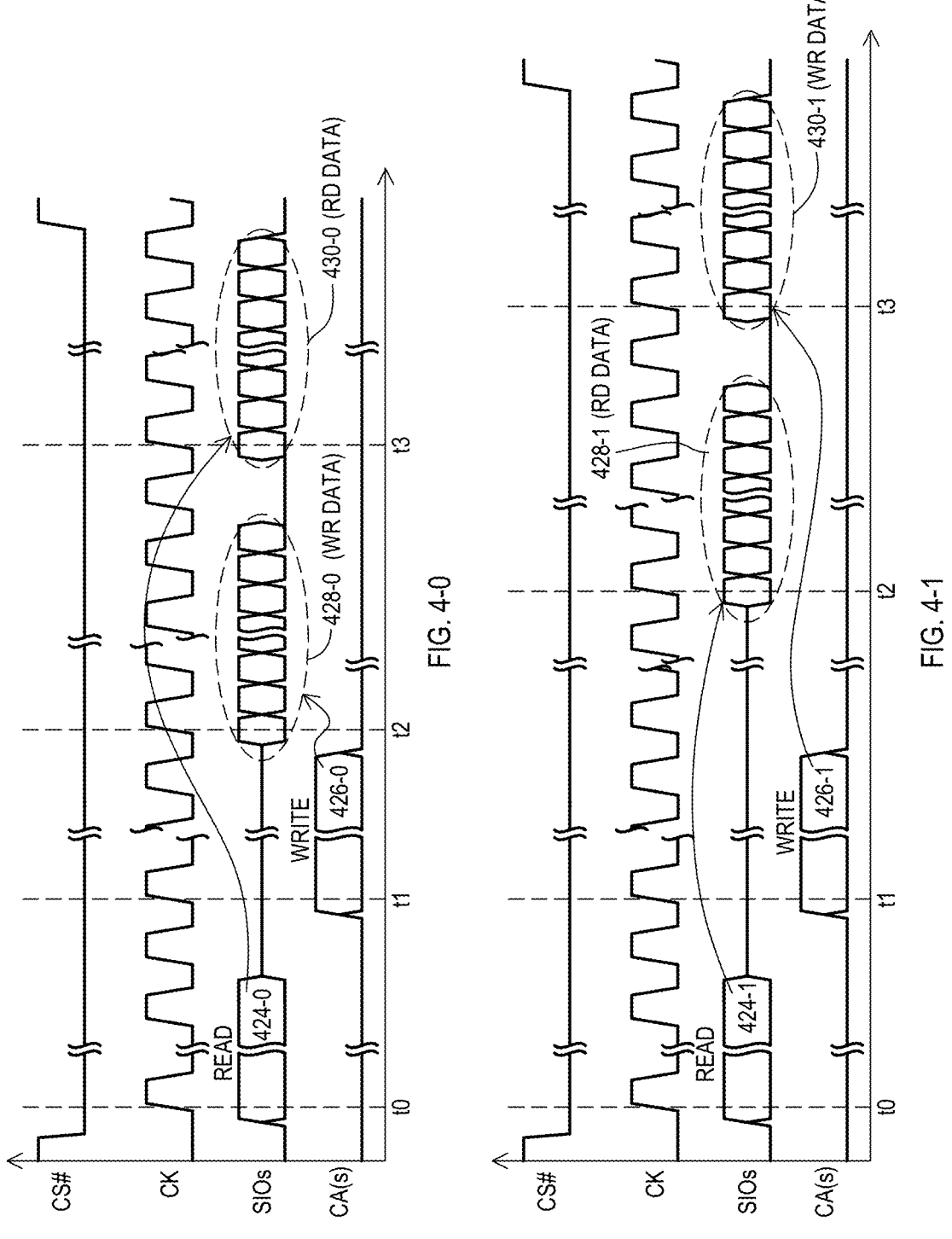

FIG. 4-0 is a timing diagram showing a memory device operation that includes a read access followed by a write access. FIG. 4-0 includes the same type of waveforms as FIG. 1-1.

Referring still to FIG. 4-0, following an active CS #signal, at about time to read instruction and address values 424-0 can be received on SIOs. In some embodiments, such instruction values can also indicate a type of operation indicated by data on CA(s). At about time t1, operation information 426-0 for a write operation can be received at CA(s). In some embodiments, operation information 426-0 can indicate a write operation and write address. However, in other embodiments operation information 426-0 can include address values, with the type of access being indicated by instruction values in 424-0.

At about time t2, write data 428-0 corresponding to operation data 426-0 can be driven on SIOs. In some embodiments, operation information 426-0 and write data 428-0 can be received during a RL or access time for the read access initiated by 424-0. At about time t3, read data corresponding to read access 424-0 can be driven on SIOs. In some embodiments, a write access initiated by 426-0 can be a "delayed" write operation, where write data are stored before being written into an array.

Referring now to FIG. 4-1, another operation with a read access and write access is shown in a timing diagram. FIG. 4-1 includes items like those of FIG. 4-0, with instruction/ address values 424-1 on SIOs initiating a read access and subsequent operation information 426-1 on CA(s) initiating a write access. However, read data 428-1 driven on SIOs can precede write data 430-1 on SIOs. In some embodiments, an operation like that of FIG. 4-1 can be a read-modify-write operation, where data are read from and then written to a same address. In such an embodiment, operation information 426-1 need not include address values, as the address is known from values 424-1 received at t0.

While FIGS. 4-0/1 show operations with read accesses initiated by values on SIOs followed by write accesses initiated by information on CA(s), alternate embodiments can include write accesses initiated by values on SIOs followed by read accesses initiated by information on CA(s).

In this way, memory device operations can include accesses of a first type (e.g., read or write) initiated by values received on SIOs followed by accesses of a second type (e.g., write or read) initiated by information received on one or more CA inputs.

Figures 5, 6:
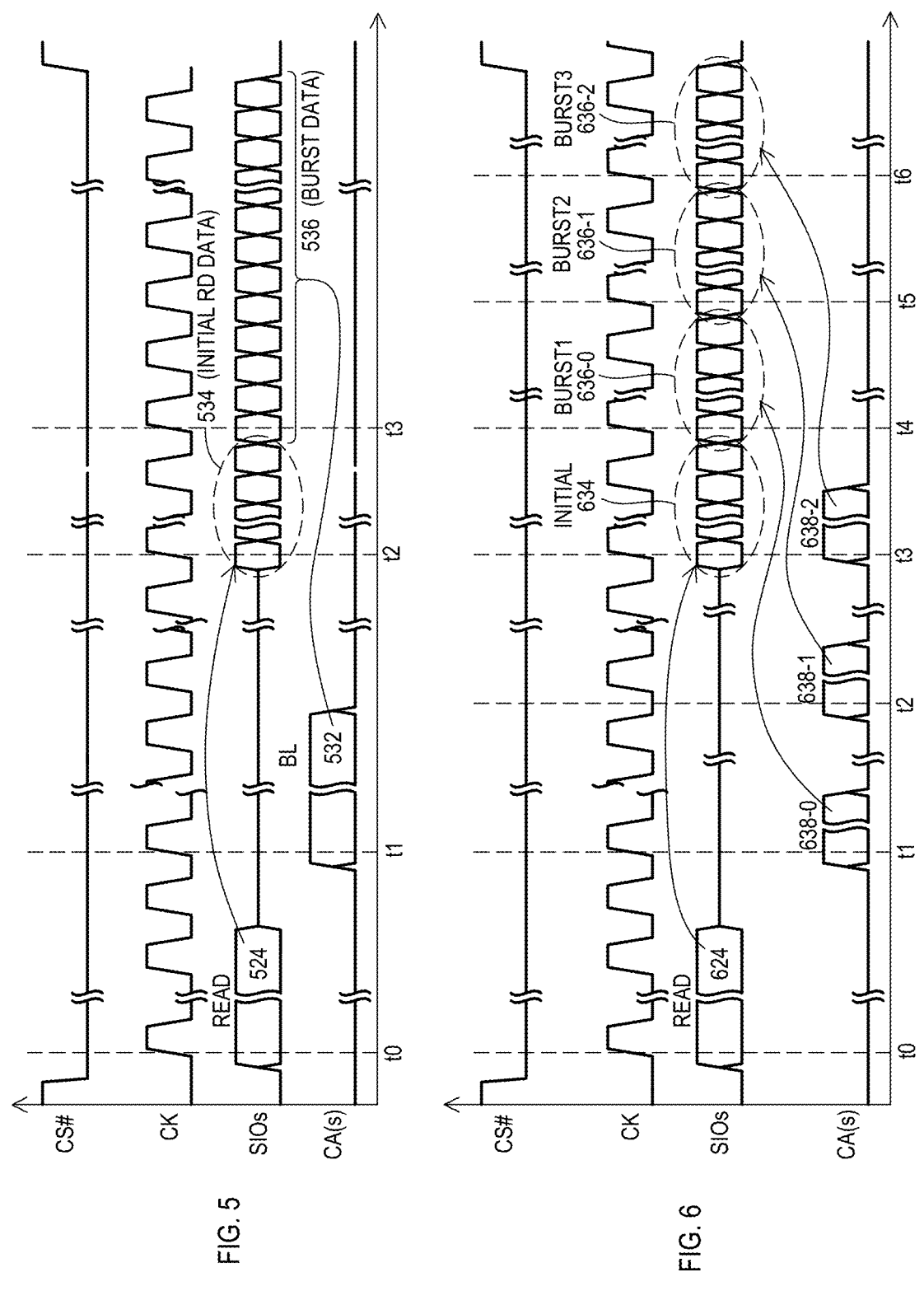
FIG. 5 is a timing diagram showing a burst access operation according to an embodiment.
FIG. 6 is a timing diagram showing a burst access operation according to another embodiment.

According to embodiments, the ability to provide additional information via one or more CA inputs can be used in burst access operations. Examples of such embodiments are shown in FIGS. 5 and 6. FIGS. 5 and 6 are timing diagrams that include the same type of waveforms as FIG. 1-1.

Referring to FIG. 5, following CS #going active, at about time to, read instruction and address values 524 can be received on SIOs. Subsequently, at about time t1, operation information 532 can be received on CA(s), which can indicate a BL. At about time t2, in response to instruction/ address values 524, following a read latency or other access time, corresponding read data 534 can be output on SIOs. At about time t3, in response to operation information 532, burst read data 536 can be output immediately after initial read data 534. Burst read data 536 can be data stored at locations that follow those indicated by the instruction/ address values of 524. That is, operation data 532 can extend a burst size beyond that achieved with instruction/address values 524 provided on SIOs.

Referring to FIG. 6, following CS #going active, at about time to, read instruction and address values 624 can be received on SIOs. Subsequently, at about time t1, first operation information 638-0 can be received on CA(s), which can indicate an initial BL extension. At about time t2, second operation information 638-1 can be received on CA(s) indicating a further BL extension.

At about time t3, following a read latency/access time delay, initial read data 634 corresponding to instruction/ address values 624 can be output on SIOs. Also at about time t3, third operation information 638-2 can be received that indicates a third BL extension. At about time t4, in response to first operation information 638-0, a read data burst can be extended with burst data 636-0. At about time t5, in response to second operation information 638-1, a read data burst can be further extended with burst data 636-1. At about time t6, in response to third operation information 638-2, a read data burst can be even further extended with burst data 636-2.

It is understood that sizes of burst data 636-0 to 636-2 may be the same or may be different. Further, sizes of burst data 636-0 to 636-2 can be established by instruction/ address data 524, by the corresponding operation information (638-0 to -1), or combinations thereof. While any of operation information (638-0 to -1) can include bit values (e.g., BL size, address, address offset), in some embodiments, operation information (638-0 to -1) can be as simple as a signal (i.e., transition high) indicating a burst extension having a size dictated by instruction/address values 624 and/or some default value. While FIGS. 5 and 6 show CA inputs that extend read accesses, other embodiments can include extending write accesses.

In this way, memory device operations can include accesses initiated by instruction and address values received on SIOs that can be extended according to operation information received on one or more CA inputs after the instruction/address values.

Figures 7, 8:
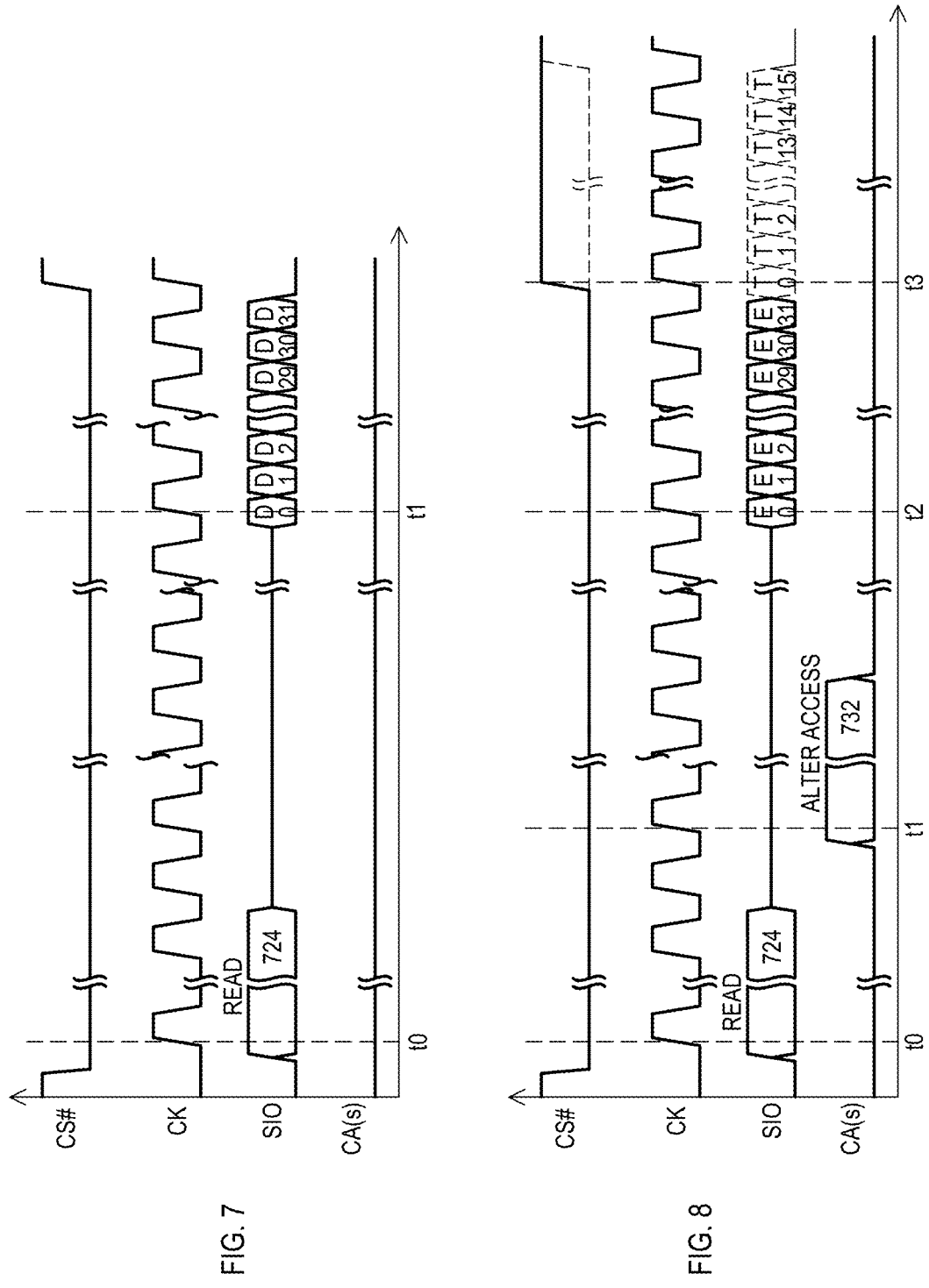
FIGS. 7 and 8 are timing diagrams showing how a memory access operation can be modified by operation data received on a control (CA) input according to an embodiment.

According to embodiments, the ability to provide additional transaction information via one or more CA inputs can be used to modify existing memory access operations. An example of such an embodiment is shown in FIGS. 7 and 8. FIGS. 7 and 8 are timing diagrams that include waveforms like those of FIG. 1-1, and can depict operations for a same memory device.

Referring to FIG. 7, following CS #going active, at about time to, read instruction and address values 724 can be received on SIOs. No operation information can be received on CA(s). Consequently, following a RL or other access time, read data can be driven on SIOs at about time t1. In some embodiments, a memory device operation shown in FIG. 7 can be a conventional read according to an existing standard.

Referring to FIG. 8, following CS #going active, at about time to, read instruction and address values 724 can be received on SIOs. In some embodiments, instruction/address values 724 of FIG. 8 can be the same as those of FIG. 7. Unlike FIG. 7, at about time t1, operation information 732 can be received on CA(s). Operation information 732 can indicate a variation, enhancement or other change to an access indicated by instruction/address values 724. In the embodiment shown, operation information 732 can add encryption and/or authentication to a transaction. Consequently, unlike FIG. 7, at about time t2, altered (i.e., encrypted) read data can be output on SIOs. In the embodiment shown, at about time t3, additional "tag" data can be output that can be used for additional operations (e.g., authentication, error detection, error correction).

While FIG. 8 shows CA inputs that can modify/alter read accesses, other embodiments can modify any other suitable memory access type.

In this way, memory device operations can include accesses initiated by instruction and address values received on SIOs that can be altered according to operation information received on one or more CA inputs after the instruction/address values.

FIG. 9 is a table showing how instruction values received on SIOs can indicate whether or not information on CA(s) will be used in a memory device operation. In the particular embodiment shown, instruction data can be received on a rising edge (CK HI) and subsequent falling edge (CK LO) of a serial clock. If a same instruction value is received on both clock edges (e.g., XX and XX), then CA inputs can be disregarded (e.g., CA inputs will not affect the operation). If a different instruction value 940 is received on a falling edge (e.g., XX followed by YY), then CA inputs can be active. In some embodiments, instruction values (XX, YY) can be hexadecimal representations of bit values. In some embodiments, a first (i.e., rising edge) instruction value can be compatible with an existing standard (e.g., SPI).

FIG. 10 is another table showing how instruction values received on SIOs can indicate whether or not input data on CA(s) will be used in a memory device operation. In the particular embodiment shown, instruction values (CMD) and address values (ADD) can be received on consecutive rising and falling edges of a serial clock. Thus, CA0[47:40] can represent bit values received on a rising edge of a first clock cycle, and CA2[7:0] can represent bit values received on a falling edge of a last (i.e., third) clock cycle of an instruction address sequence. Any of bit values shown as 1040 can be used to indicate that CA input(s) are active. In some embodiments, CMD and ADD values can be compatible with an existing standard (e.g., Hyperbus™).

In this way, instruction values received over SIOs can indicate if a memory device transaction will utilize information received at CA(s) inputs.

Figures 0, 11:
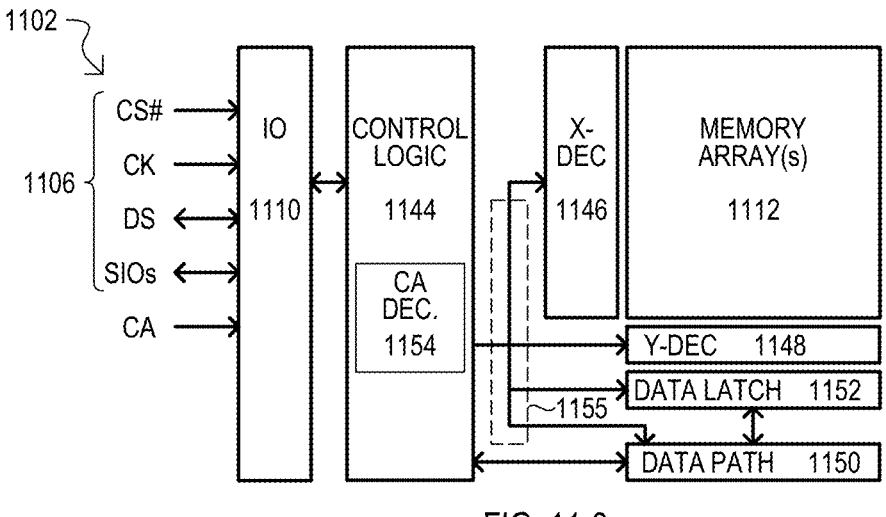
Figures 1, 11:
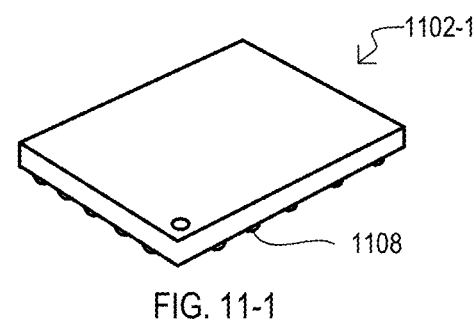

FIG. 11-0 is a block diagram of a memory device 1102 according to an embodiment. A memory device 1102 can include memory array(s) 1112, IO circuits 1110, control logic 1144, first decoder circuits 1146, second decoder circuits 1148, data latch 1152 and data path 1150. A memory array 1102 can include memory cells of any suitable type, including nonvolatile memory cells, volatile memory cells and combinations thereof. IO circuits 1110 can be connected to a serial bus 1106, which can carry a chip select signal CS #, a serial clock SCK, a data strobe DS, and SIOs. In addition, IO circuits 1110 can receive a CA input. In some embodiments, IO circuits 1110 can be compatible with low voltage complementary metal oxide semiconductor (LVC-MOS) signaling, having logic levels less than 5 volts, including as low as 0.7 volts. However, alternate embodiments can operate according to any other suitable signaling standard.

Control logic 1106 can receive instruction values and address values received at IO circuits 1104, and in response, generate control signals 1115. Control signals 1155 can control accesses to memory arrays 1112. Unlike a conventional memory device, control logic 1144 can include CA decode circuits 1154 that can generate control signals 1155 that provide operations beyond those possible with only instructions and addresses received on SIOs.

First decoders circuits 1146 can select rows of memory cells, and in some embodiments a higher organization of memory cells (e.g., blocks, banks). Second decoder circuits 1148 can select columns of memory cells. A data latch 1152 can latch data for writing into memory arrays 1112. A data path 1150 can transfer data between control logic 1144 and data latch 1152 and/or memory arrays 1112.

Operations of a memory device 1102 can take the form of any of those described herein, or equivalents. Instruction and address values can be received on SIOs, followed by operation information at CA. In response to such values, control logic 1144 can generate control signals for executing the memory access operations indicated by instruction values and operation information input at CA.

In this way, a memory device can decode instruction values and address values received at SIOs and operation information received at a CA input to enable memory access operations. In some embodiments, operation information can be received after instruction values. In some embodiments, a memory device can execute memory access operations compatible with one or more existing standards when instruction and address values are received without operation information at CA inputs.

While embodiments can include devices and systems with various interconnected components, embodiments can also include unitary devices which can execute memory device operations as described herein and equivalents. In some embodiments, such unitary devices can be advantageously compact single integrated circuits (i.e., chips). FIG. 11-1 shows a packaged memory IC device 1102-1 which can execute data transaction according to embodiments described herein. In some embodiments, a memory device 1102-1 can include external connections for an existing serial bus standard (e.g., SPI, Hyperbus™). However, in addition, a memory device 1102-1 can include a CA port 1108 for receiving operation information. A CA port 1108 can include one or more physical connections (e.g., pins). However, a memory device according to embodiments can include any other suitable integrated circuit packaging type, as well as direct bonding of a device chip onto a circuit board or substrate.

In this way, an IC memory device can add additional functionality to an existing serial bus standard with one or more CA inputs that receive operation information that is in addition to instruction and address data received on SIOs.

Figure 12:
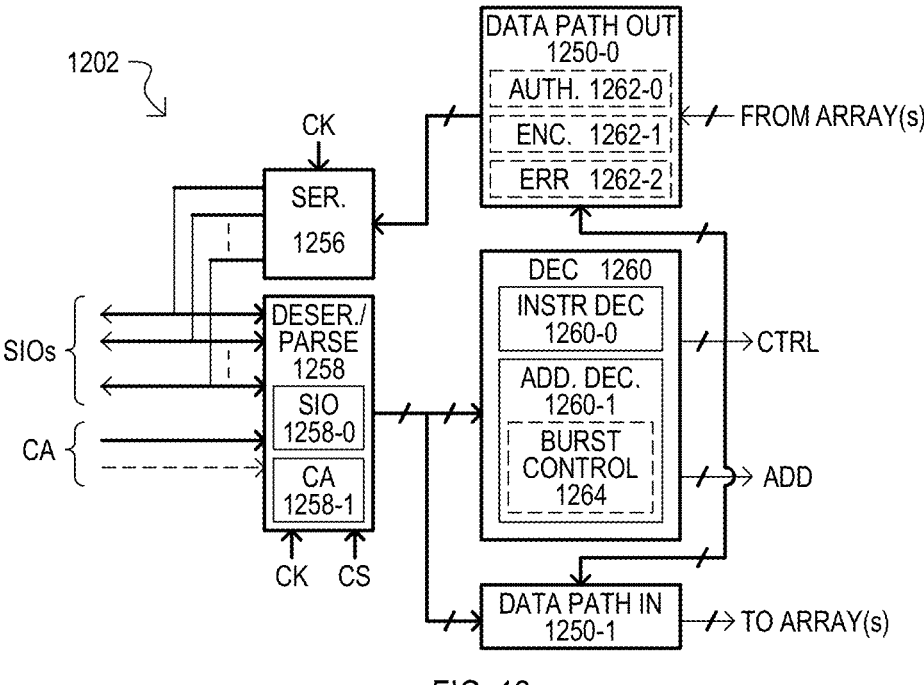
FIG. 12 is a block diagram of a memory device according to another embodiment.

FIG. 12 is a block diagram of a portion of a memory device 1202 according to an embodiment. A memory device 1202 can include serializer 1256, de-serializer 1258, decoder circuits 1260, and data path out circuits 1250-0 and data path in circuits 1250-1. Serializer 1256 can receive output data from data path out circuits 1250-0. Such output data can be driven as serial data streams on SIOs in synchronism with a serial clock CK. In some embodiments, such output data can be DDR.

De-serializer 1258 can receive input serial values from each of SIOs and well as from CA input(s) in synchronism with CK. Inputs from SIOs can be parsed into information of different types (e.g., instruction values, address values, write data values) according to when it is received with respect to the activation of a chip select signal. Inputs from CA(s) can be parsed based on configuration data, which can be established in any suitable manner, including but not limited to, configuration of the memory device (e.g., data written into a configuration register) and/or data received on SIOs (e.g., an instruction indicates format of CA input information).

Decoder circuits 1260 can include an instruction decoder 1260-0 and address decoder 1260-1. Instruction decoder 1260-0 can receive parsed instruction values received on SIOs, and in some embodiments, data parsed from CA input(s). From such values control signals (CTRL) can be generated for controlling operations of memory device 1202. In this way, values received on CA inputs can be used to effect memory device operations, including altering an access, or creating a new access as described herein and equivalents.

Address decoder 1260-1 can receive parsed address values received on SIOs, and in some embodiments, information parsed from CA input(s) and generate address decoder signals ADD. In some embodiments, address decoder 1260-1 can include a burst control circuit 1264, which can control burst access operations in response to instructions values and/or values received on CA inputs. In this way, values received on CA inputs can be used to control locations accessed in memory device operations, including burst accesses.

Data path in circuits 1250-1 can relay write data received on SIOs for storage in a memory device, including in arrays and/or other destinations (e.g., configuration registers).

Data path out circuits 1250-0 can receive data from an array and provide such data for output on SIOs. In some embodiments, data path out circuits 1250-0 can process output data. Such processing can include, but is not limited to, authentication 1262-0 (e.g., generating a value, such as a message authentication code, for transmission with the output data), encryption 1262-1 of output data, or error detection/correction (e.g., generating an error correction code for the output data that is transmitted with the output data). In some embodiments, data processing (any of 1262-0/1/2) can be enabled by control signal CTRL generated in response to CA input information. In this way, values received on CA inputs can be used to control processing of output data from a memory device.

Figures 0, 13:
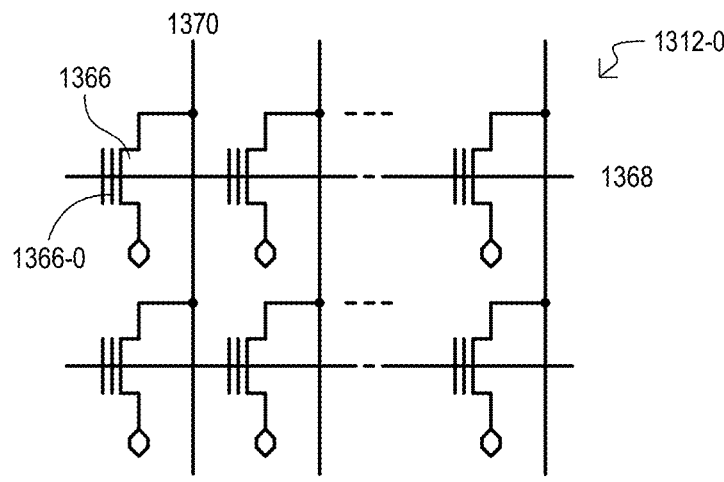
Figures 1, 13:
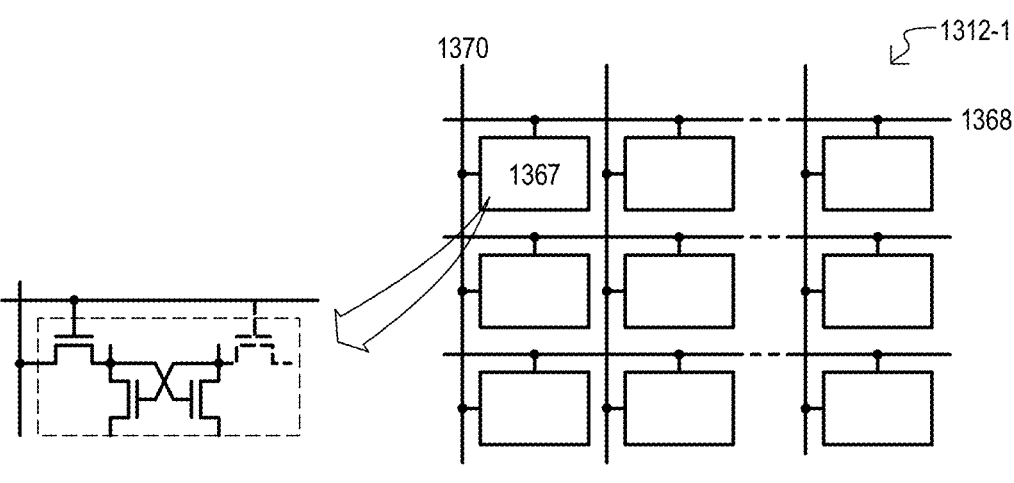
Figures 2, 13:
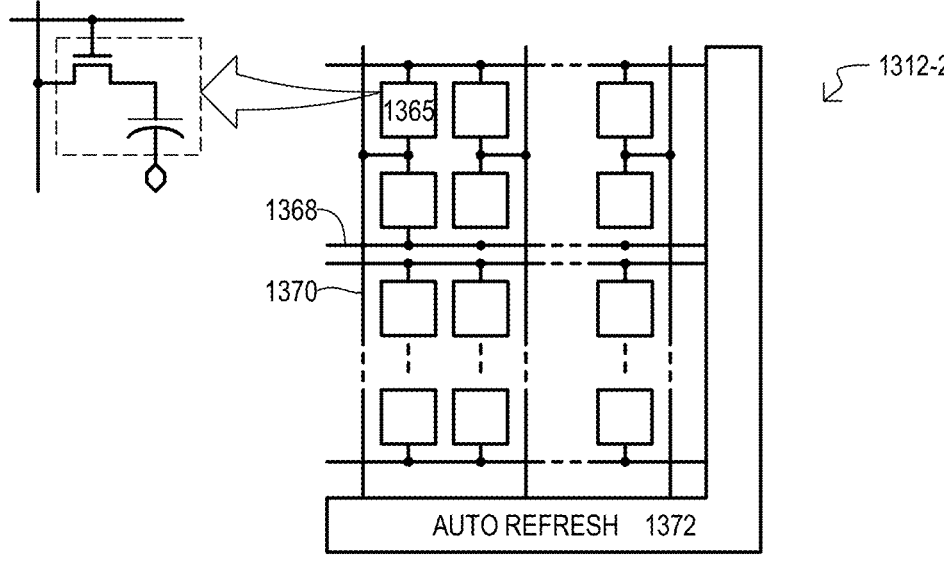

While embodiments can include memory arrays of any suitable type, some embodiments can include 1-transistor (1T) NOR type arrays. FIG. 13-0 is a schematic diagram of a 1T NOR array 1312-0 that can be included in embodiments. Array 1312-0 can include a number of memory cells (one shown as 1366) arranged into rows and columns, with memory cells of a same row being connected to a same word line (one shown as 1368) and memory cells of a same column being connected to a same bit line (one shown as 1370). In some embodiments, memory cells (1366) can be formed with a single transistor structure, having a charge storing structure 1366-0 between a control gate and a channel. A charge storing structure 1366-0 can store one or more bits of data as charge (including absence of charge) without the need for power to maintain the data. A charge storing structure 1366-0 can take any suitable form including but not limited to: a floating gate, a charge storing dielectric (e.g., replacement gate), or a combination thereof. However, embodiments can include any other suitable nonvolatile memory cell type.

In some embodiments, accesses to a memory cell array 1312-0 can be controlled by both SIO instruction data and operation information received on a CA input, to enable execute-in-place (XiP) reading of code for execution by a processor. Such XiP operations can include advantageously pipelined random access reads using CA inputs to provide a next address while a previous read access is being executed.

Embodiments can also include any suitable volatile array structure or volatile memory cell type. FIG. 13-1 is a schematic diagram of a static random access memory (SRAM) array that can be included in embodiments. FIG. 13-1 shows an array 1312-1 with SRAM cells (one shown as 1367) arranged into rows and columns and connected to one or more bit lines (e.g., 1370) and word lines (e.g., 1368). SRAM cells 1367 can include, but are not limited to, 4-transistor (4T), 6T and/or 8T variations.

FIG. 13-2 is a schematic diagram of a "pseudo" SRAM (PSRAM) array 1312-2 that can be included in embodiments. FIG. 13-2 shows an array 1312-2 with dynamic RAM (DRAM) cells (one shown as 1365) arranged into rows and columns and connected to one or more bit lines (e.g., 1370) and word lines (e.g., 1368). Data stored by DRAM cells 1365 can be refreshed with an autorefresh circuit 1372. In some embodiments, an autorefresh circuit 1372 can result the addition of some delay between receipt of an instruction and data being driven on SIOs. In some embodiments, operation information can be input on CA during such access times.

In this way, memory devices having SIOs and one or more CA inputs can include memory cells of various types. Further, advantageous operations provided by operation data received on CA inputs can provide benefits for particular memory cell array types.

While the systems, devices and timing diagrams have shown various methods according to embodiments, additional methods will now be described with reference to flow diagrams. Such methods can be executed by circuits of devices and/or systems described herein.

Figure 14:
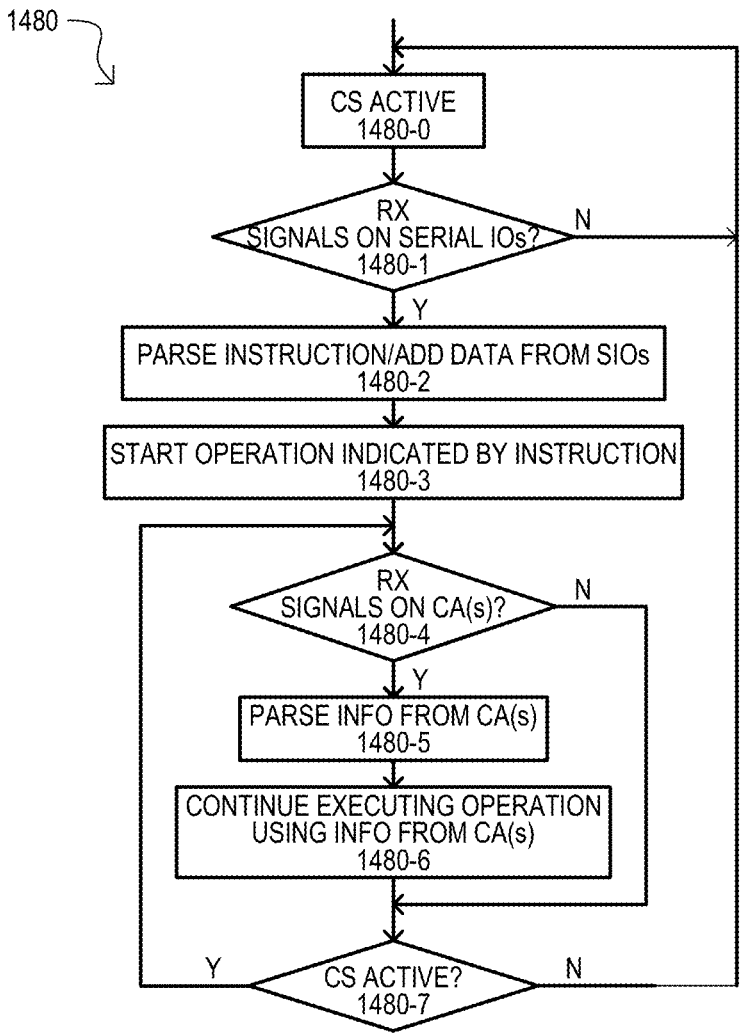
FIG. 14 is a flow diagram of a method according to an embodiment.

FIG. 14 is a flow diagram of a method 1480 according to an embodiment. A method can be executed by a memory device having both SIOs and one or more CA inputs. A method 1480 can include determining that a CS signal has transitioned to an active level 1480-0. If a CS signal is active, a method 1480 can determine if signals are received on SIOs 1480-1. If signals are not received (N from 1480-1), a method 1480 can return to 1480-0.

If signals are received on SIOs (Y from 1480-1), a method can parse instruction values, and if present, address values from such signals (1480-2). Such an action can include distinguishing instruction values from address values based on when such data is received. Upon parsing at least instruction values, a method 1480 can start an operation indicated by the instruction values 1480-3.

A method 1480 can determine if signals are received on CA inputs 1480-4. If signals are received on CA inputs (Y from 1480-4), information from such signals can be parsed 1480-5. Such an action can include, but is not limited to, determining a type of information received on CA inputs according to previously established configuration data, or from instruction data received on SIOs. In some embodiments, information parsed from CA inputs can be the equivalent of instruction data and/or address data. Using information parsed from signals as CA inputs, a method can continue to execute the operation indicated by instruction data received on SIOs 1480-6. Such an action can include any of those described herein or equivalents, including extending an access type started by a previous instruction starting an entirely different memory access type (e.g., an instruction value received on SIO can indicate a read access and CA input values can indicate a write access), or altering an access type (e.g., processing output data).

If signals are not received on CA inputs (N from 1480-4) or operations are executed using data from CA inputs, a method 1480 can determine if a CS signal is still active 1480-7. If a CS signal is still active (Y from 1480-7), a method 1480 can return to monitoring CA inputs for signals 1480-4. If CS is not active (N from 1480-7), a method 1480 can return to 1480-0. However, alternate embodiments can utilize another feature to determine when operations are ended, with CS being allowed to return to an inactive state while data from CA initiated operations are being accessed and/or output.

In this way, memory device operations can be started by instructions on SIOs, and then continued according to information received on one or more CA inputs.

Figure 15:
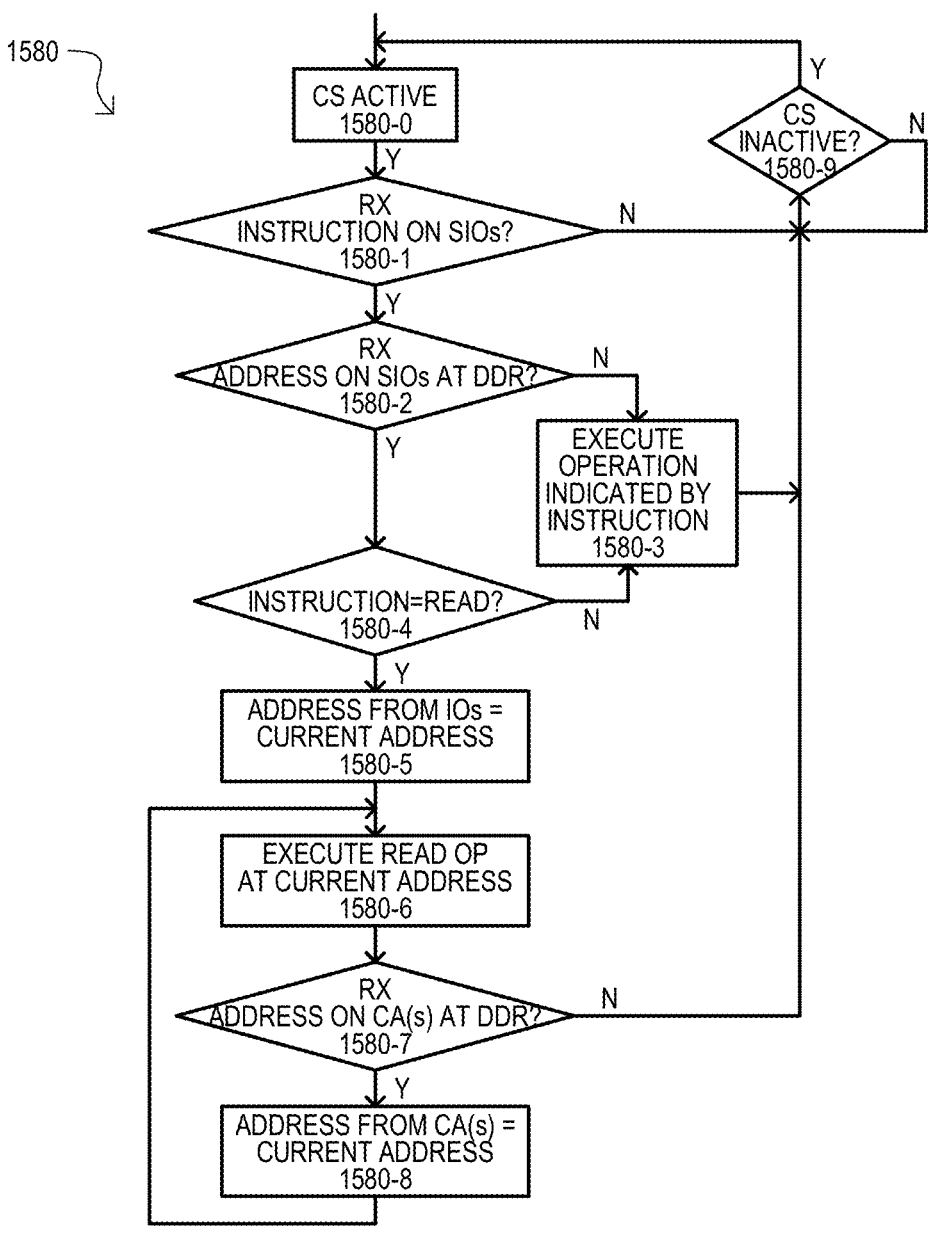
FIG. 15 is a flow diagram of a method according to another embodiment.

FIG. 15 is a flow diagram of a method 1580 for executing random access memory reads from a memory device with a serial interface according to an embodiment. A method can be executed by a memory device as described herein or an equivalent. A method 1580 can include determining that a chip select signal has transitioned to an active level 1580-0. If a CS signal is active, a method 1580 can determine if an instruction has been received on SIOs 1580-1. Such an action can include receiving an instruction at SDR or DDR. If an instruction is not received (N from 1580-1), a method 1580 can determine if CS is inactive 1580-9.

If an instruction has been received on SIOs (Y from 1580-1), a method can determine if address values are received on SIOs at a DDR 1580-2. If address values have not been received (N from 1580-2), a method can execute the operation indicated by the instruction 1580-3. If address values are received (Y from 1580-2), a method 1580 can determine if a received instruction is a read instruction 1580-4. If a received instruction is not a read instruction (N from 1580-4), a method 1580 can execute the instruction 1580-3 and then determine if CS is inactive 1580-9.

If a received instruction is a read instruction (Y from 1580-4), a method 1580 can use the address received on the SIOs as a current address 1580-5 and execute a read operation at such a current address 1580-6. A method 1580 can then determine if address values are received on one or more CA inputs 1580-7. If address values are not received (N from 1580-7), a method can determine if CS is inactive 1580-9. If address values are received on CA inputs (Y from 1580-7), a method can use such address values as a current address 1580-8 and execute a read operation at the current address 1580-5. It is understood such an address received on CA inputs can be a "random" address, as it can be unrelated to an address received on SIOs.

If a CS signal transitions to an inactive level (Y from 1580-9) a current operation can end.

In this way, an initial read access can be started by instruction values received on SIOs. While the initial read access is being executed, one or more follow-on read accesses can be initiated by address values received on CA inputs. The initial and follow-on read accesses can be random read accesses.

Figure 16:
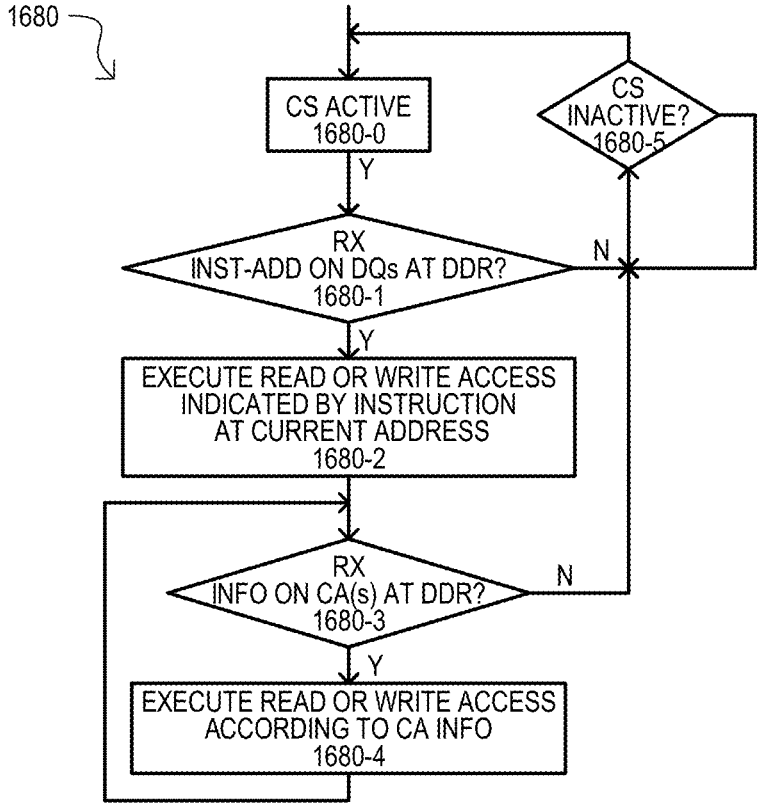
FIG. 16 is a flow diagram of a method according to a further embodiment.

FIG. 16 is a flow diagram of a method 1680 for executing different access types in a same operation initiated by an instruction. A method can be executed by a memory device as described herein or an equivalent. A method 1680 can include determining that a chip signal has transitioned to an active level 1680-0. If a CS signal is active, a method 1680 can determine if instruction and address data are received on data IOs (DQs) at a double data rate 1680-1. If instruction and address data are not received (N from 1680-1), a method 1680 can determine if CS is inactive 1680-5. If instruction and address data have been received on DQs (Y from 1680-1), a method can execute a read or write access indicated by the instruction at the address 1680-2.

A method 1680 can determine if information is received on CA inputs at a double data rate 1680-3. Information received at CA inputs can take any suitable form, and can include information indicating an operation type and/or a new address. It is understood that CA information need not include an instruction encoded in the same manner as that received on DQs. Further, an absence of instruction data on CA inputs can indicate a next access can be of the same type as a previous access. Similarly, a new address need not be a full address, but rather a value that enables the generation of a new address (e.g., offset, burst continue). If information are not received on CA inputs (N from 1680-3), a method 1680 can determine if CS is inactive 1680-5.

If information are received on CA inputs (Y from 1680-3), a method 1680 can execute a follow-on read or write access indicated by the CA information 1680-4. Such a follow-on access can be at a same address or a new address indicated by CA information. Follow-on accesses can continue in response to information received on CA inputs.

If a CS signal transitions to an inactive level (Y from 1680-5) a current operation can end. However, as noted herein, alternate embodiments can include a CS signal transitioning inactive at an earlier time (e.g., after read data from a first read operation are received).

In this way, an initial memory access can be initiated by instruction values received on SIOs. While the initial access is being executed, one or more follow-on accesses can be initiated by values received on CA inputs. Such follow-on accesses can be of the same type as, or a different type than the initial access.

Figures 0, 1, 17:
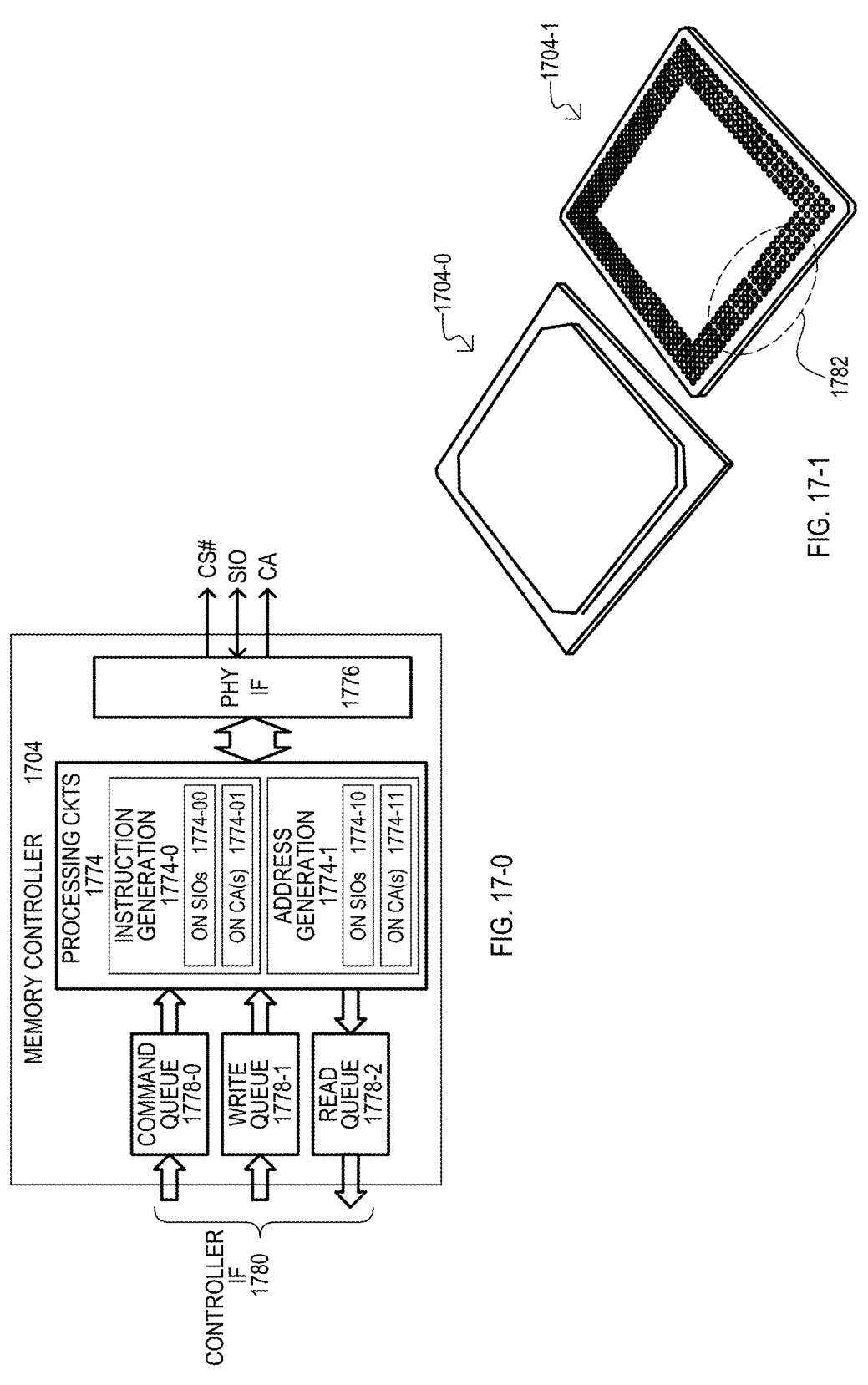

While embodiments can include memory devices that execute memory access that can be controlled by an initial instruction on SIOs and subsequent operation information on CA inputs, embodiments can also include memory controller circuits that can generate such data over a compatible interface. Such a memory controller can be part of a host device. FIG. 17-0 shows a memory controller 1704 according to an embodiment. A memory controller 1704 can include processing circuits 1774, IF circuits 1776, a command queue 1778-0, a write queue 1778-1, and a read queue 1778-2.

Processing circuits 1774 can include generate instructions 1774-0 and can generate addresses 1774-1. Generating instructions 1774-0 can include generating instructions for output on SIOs 1774-00 and/or for output on CA(s) 1774-01. In some embodiments, instructions output on SIOs 1774-00 can take the form of one or more standards (e.g., SPI, Hyperbus™). Instructions output on CA(s) 1774-01 may or may not take the form of one or more standards. As noted herein, in some embodiments, CA instruction data can be as simple as the assertion of a signal to an active level. In some embodiments, generating instructions 1774-0 can include monitoring a command queue and determining if consecutive commands can be serviced with an instruction in SIOs followed by operation information on CA, instead of one SIO instruction followed by another SIO instruction.

Generating addresses 1774-1 can include generating address values for output on SIOs 1774-10 and/or for output on CA(s) 1774-11. In some embodiments, address values for CA(s) 1774-11 can be generated in response to locations in command queue 1778-0. As but one example, in response to a sequence of random read commands, while an address for a first read command can have an address encoded for output on SIO, a subsequent read command can have an address encoded for output on CA(s).

A command queue 1778-0, a write queue 1778-1 and read queue 1778-2 can be connected to a controller IF 1780, which can be part of a larger host device, or connected to a host device via a communication path. A command queue 1778-0 can receive memory requests over controller IF 1780 to access a memory device (not shown) in communication with controller 1704 over interface 1776. A write queue 1778-1 can receive write or program data associated with a memory access. A read queue 1778-2 can provide read data resulting from a serviced read memory (or register) access.

While embodiments can include systems with memory devices operating in conjunction with a controller device, embodiments can also include standalone controller devices capable of encoding memory access requests into instruction and address data for transmission over SIOs as well as operation data transmitted over one or more CA outputs. Such an embodiment is shown in FIG. 17-1. FIG. 17-1 shows a packaged controller device in a perspective top view 1704-0 and bottom view 1704-1. Host device 1704-0/1 can include a number of physical connections (e.g., 1782) which can include connections compatible with a serial communication standard, as well as one or more CA ports (which can each include one or more CA connections). In some embodiments, a controller device can be a System-On-Chip (SoC) type device. It is understood that host devices can include any other suitable package type.

In this way a memory controller can generate instruction and/or address values on SIOs and CA outputs, to enable memory operations to be executed in response to instruction values, address values and CA operation information.

Figure 18:
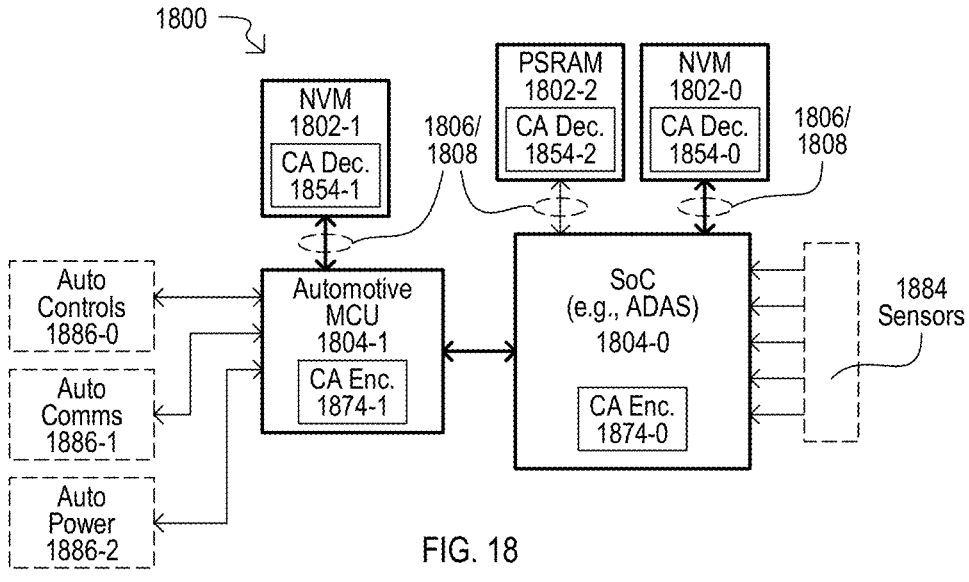
FIG. 18 is a block diagram of a vehicle system according to an embodiment.

Embodiments can include any suitable system that can benefit from high throughput memory accesses, particularly direct reads from nonvolatile memory (e.g., XiP operations). Embodiments can be advantageously employed in systems that access code from high reliability, secure memory devices, such as automobile systems. FIG. 18 shows an automobile system 1800 according to an embodiment. System 1800 can include a first NVM device 1802-0, second NVM device 1802-1, PSRAM 1802-2, a system-on-chip (SoC) 1804-0, automotive microcontroller (MCU) 1804-1, sensors 1884, auto controls 1886-0, auto communications systems 1886-1, auto power systems 1886-2.

NVM device 1802-0 and PSRAM 1802-2 can be connected to SoC 1804-0 by a serial bus system according to an existing standard 1806 (e.g., CS #, CK, SIOs) as well as a CA connection 1808. Similarly, NVM device 1802-1 can be connected to MCU 1804-1 by a serial bus 1806 and CA connection 1808. NVM devices 1802-0/1 and PSRAM 1802-2 can include CA decoder circuits for enabling operations in addition to those provided by a bus 1806 as described herein and equivalents.

SoC 1804-0 can access NVM device 1802-0 and PSRAM 1802-2 with transactions according to a standard over serial bus system 1806. However, in addition, SoC 1804-0 can execute additional transactions by encoding instruction and/or address values into CA signals 1874-0 as described herein or equivalents. In the same fashion, MCU 1804-1 can execute memory device transactions with NVM device 1802-1 over serial bus system 1806, but also additional operations by including operation information encoded into CA values 1874-1 with instruction and address values provided over bus system 1806.

In this way, an automobile control system can include one or more memory devices that can execute memory access operations according to instruction and address data received over a serial bus system and additional operation information received on one or more CA inputs. In some embodiments, such accesses can be XiP reads.

Figure 19:
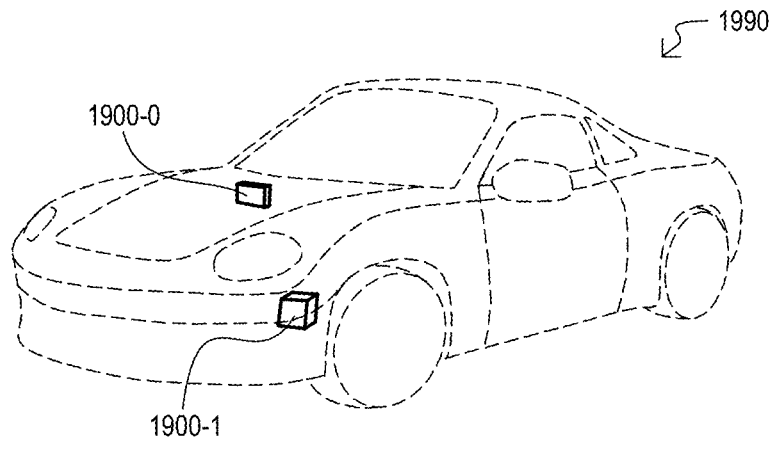
FIG. 19 is a diagram of a vehicle system according to another embodiment.
Figures 0, 1, 2, 3, 20:
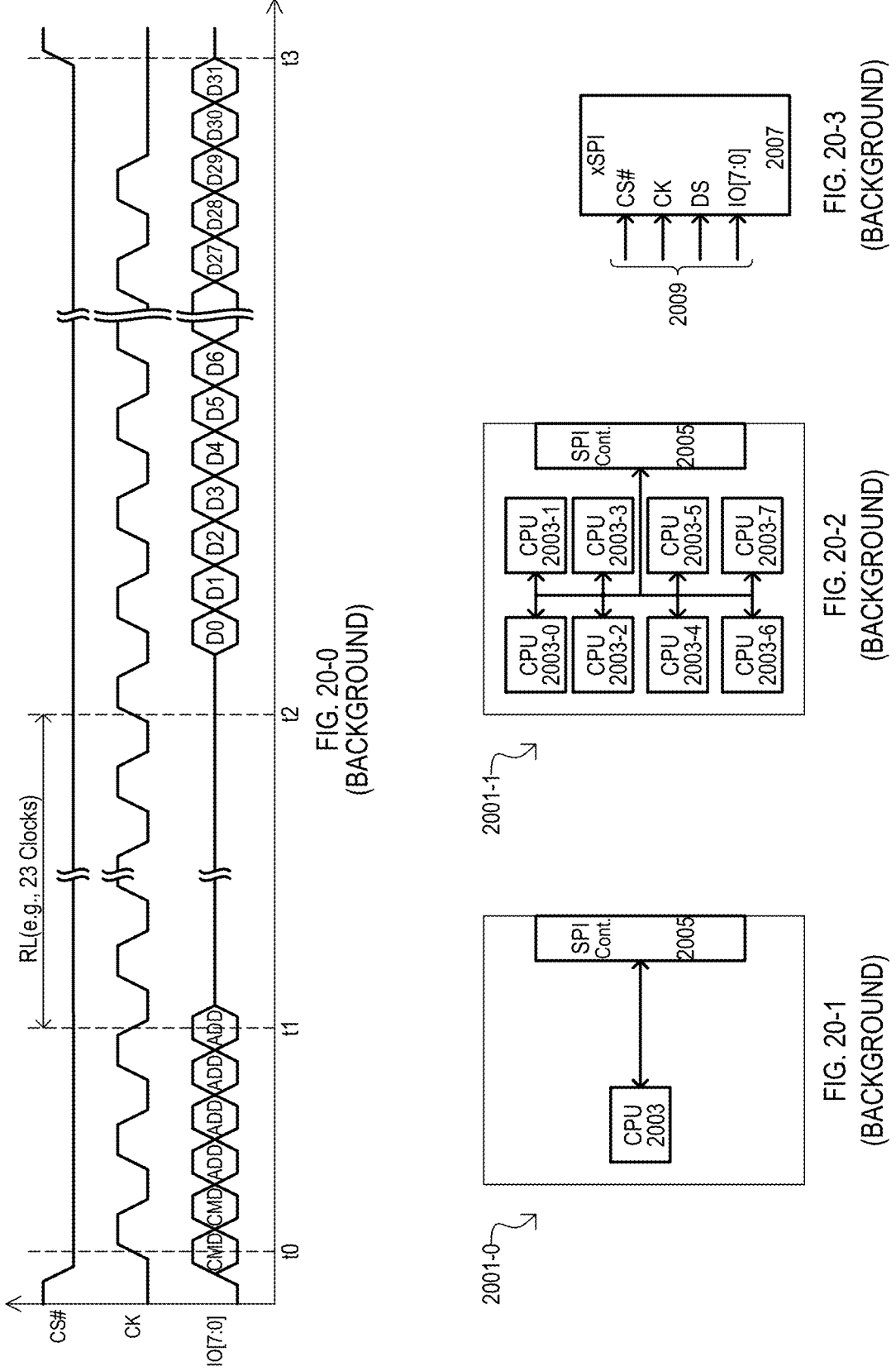

Referring to FIG. 19 an automobile system 1990 according to another embodiment is shown in a diagram. An automobile system 1990 can have numerous sub-systems (two shown as 1900-0 and 1900-1) that operate with firmware accessed from an NVM device. Such sub-systems (1900-0/1) can include an electronic control unit (ECU) and/or an advanced driver assistance system (ADAS). However, in other embodiments such sub-systems can include a dashboard display/control sub-system and/or an infotainment sub-system, as but two of numerous possible examples. Each subsystem (1900-0/1) can include at least one host device and one or more NVM devices that can execute memory device operations in response to SIO and CA inputs, as described herein or equivalents.

In this way, an automobile can benefit from additional operation capabilities provided by a CA input included with an existing serial bus system.

It is understood that write operations as described herein can include program operations that write data to nonvolatile memory cells Embodiments can include methods, devices and systems that include detecting an active chip select (CS) signal at a CS input of a memory device; while the CS signal is active, receiving a first read instruction and a first address in synchronism with a serial clock at a plurality of serial input/output (SIOs) of the memory device; while the CS signal is active, initiating a first read access to the memory device indicated by the first read instruction and first address; while the CS signal remains active, receiving operation information on at least one control (CA) input after the first read instruction and first address, the at least one CA input being separate from the SIOs; while the CS signal remains active and the first read access is not complete, in response to the operation information, initiating a second read access to the memory device; and while the CS signal is active, driving first read data corresponding to the first read access on the SIOs and driving second read data corresponding to the second read access on the SIOs.

Embodiments can include methods, devices and systems that include IO circuits that have a chip select input configured to receive a chip select signal, a serial clock input, a plurality of serial IOs configured to receive at least a first read instruction and first address and to output first read data followed by second read data, and at least one CA input configured to receive operation information after the first read instruction and first address. Also included can be at least one memory cell array and control circuits. Control circuits can be coupled to the IO circuits and configured to initiate a first read access to access the first read data from the at least one memory cell array in response to the first read instruction and first address received while the chip select signal is active, and initiate a second read access to access the second read data from the at least one memory cell array in response to the operation information received while the chip select signal remains active and the first read access is not complete.

Embodiments can include methods, devices and systems that include a memory device that having IO circuits with a chip select input configured to receive a chip select signal, a serial clock input, a plurality of serial IOs configured to receive at least a first read instruction and first address and output first read data followed by second read data, and at least one CA input configured to receive operation information after the first read instruction and first address. Also included can be at least one memory cell array and control circuits. Control circuits can be coupled to the IO circuits and configured to initiate a first read access to access the first read data from the at least one memory cell array in response to the first read instruction and first address received while the chip select signal is active, and initiate a second read access to access the second read data from the at least one memory cell array in response to operation information received while the chip select signal remains active and the first read access is not complete. A serial bus can include at least a CS line coupled to the CS input, a serial clock line coupled to the serial clock input, and a different serial IO line coupled to each serial IO.

Methods, devices and systems according to embodiments can include a memory device having a read latency between receiving the first read instruction and first address on the SIOs and driving the first read data on the SIOs. Operation information can be received on the at least one CA during the read latency.

Methods, devices and systems according to embodiments can include operation information including a second address.

Methods, devices and systems according to embodiments can include first read data and second read data being driven on the SIOs in synchronism with rising and falling edges of the serial clock. First and second read data can be pipelined, with the second read data starting on a next serial clock edge following a last of the first read data.

Methods, devices and systems according to embodiments can include first and second address values that are not part of a same burst access.

Methods, devices and systems according to embodiments can include driving second read data on the SIOs while the CS signal remains active.

Methods, devices and systems according to embodiments can include, after first read data are driven on the SIOs, a CS signal can transition to an inactive state, and second read data can be driven on the SIOs while the CS signal is inactive.

Methods, devices and systems according to embodiments can include operation information having at least one burst length value. A second read access can be to the second read data stored at second addresses that sequentially follow the first address.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A method, comprising:

detecting an active chip select (CS) signal at a CS input of a memory device;

following an active CS signal, receiving a first read instruction and a first address in synchronism with a serial clock at a plurality of serial input/output (SIOs) of the memory device;

initiating a first read access to the memory device indicated by the first read instruction and first address;

receiving operation information on at least one control (CA) input after the first read instruction and first address, the at least one CA input being separate from the SIOs;

while the first read access is not complete, in response to the operation information, initiating a second read access to the memory device; and driving first read data corresponding to the first read access on the SIOs and driving second read data corresponding to the second read access on the SIOs.

2. The method of claim 1, wherein:

the memory device includes a read latency between receiving the first read instruction and first address on the SIOs and driving the first read data on the SIOs; and the operation information is received on the at least one CA during the read latency.

3. The method of claim 1, wherein the operation information includes a second address.

4. The method of claim 3, wherein:

the first read data and second read data are driven on the SIOs in synchronism with rising and falling edges of the serial clock; wherein the first and second read data are pipelined, with the second read data starting on a next serial clock edge following a last of the first read data.

5. The method of claim 3, wherein:

the first and second address values are not part of a same burst access.

6. The method of claim 3, further including:

driving the second read data on the SIOs while the CS signal remains active.

7. The method of claim 3, further including:

after the first read data are driven on the SIOs, the CS signal transitions to an inactive state; and driving the second read data on the SIOs while the CS signal is inactive.

8. The method of claim 1, wherein:

receiving the operation information includes receiving at least one burst length value; and the second read access is to the second read data stored at second addresses that sequentially follow the first address.

9. The method of claim 1, wherein:

receiving at least the first instruction and first address at the plurality of SIOs is compatible with at least one Serial Peripheral Interface (SPI) standard or at least one Hyperbus™ standard; and receiving the operation information on the at least one CA input is not compatible with the at least one SPI or Hyperbus™ standard.

10. A device, comprising:

input/output (IO) circuits that include;

a chip select input configured to receive a chip select signal;

a serial clock input;

a plurality of serial IOs configured to receive at least a first read instruction and first address and to output first read data followed by second read data; and at least one serial control (CA) input configured to receive operation information after the first read instruction and first address;

at least one memory cell array; and control circuits coupled to the IO circuits and configured to:

initiate a first read access to access the first read data from the at least one memory cell array in response to the first read instruction and first address received while the chip select signal is active; and initiate a second read access to access the second read data from the at least one memory cell array in response to the operation information received while the first read access is not complete.

11. The device of claim 10, wherein the at least one memory cell array comprises nonvolatile memory cells.

12. The device of claim 10, wherein:

the serial IOs are configured to output first read data corresponding to the first read access followed by second read data corresponding to the second read access in a same, uninterrupted burst.

13. The device of claim 10, wherein the number of at least one CA inputs is less than the number of serial IOs.

14. The device of claim 10, wherein:

the control circuits include a burst address generator configured to generate a sequence of burst addresses in response to at least the operation information; and the serial IOs are configured to output the second read data stored at the burst addresses; wherein the burst addresses sequentially follow the first address.

15. The device of claim 10, wherein:

the first read data are output on the serial IOs while the chip select signal remains active; and the second read data are output on the serial IOs while the chip select signal remains active.

16. The device of claim 10, wherein:

the first read data are output on the serial IOs while the chip select signal remains active; and the second read data are output on the serial IOs after the chip select signal transitions to an inactive state.

17. A system, comprising:

a memory device that includes:

input/output (IO) circuits having a chip select (CS) input configured to receive a chip select signal;

a serial clock input;

a plurality of serial IOs configured to receive at least a first read instruction and first address and output first read data followed by second read data; and at least one control (CA) input configured to receive operation information after the first read instruction and first address;

at least one memory cell array;

control circuits coupled to the IO circuits and configured to:

initiate a first read access to access the first read data from the at least one memory cell array in response to the first read instruction and first address, and initiate a second read access to access the second read data from the at least one memory cell array in response to operation information received while the first read access is not complete; and a serial bus that includes at least:

a CS line coupled to the CS input;

a serial clock line coupled to the serial clock input; and a different serial IO line coupled to each serial IO.

18. The system of claim 17, further including:

a controller device having controller IOs coupled to the serial bus, at least one CA output coupled to the at least one CA input, and processor circuits configured to generate the first read instruction, first address, and operation information in response to at least one memory access request.

19. The system of claim 17, wherein:

the controller device includes processing circuits configured to generate the first read instruction and first address in response to a first memory access request, and the operation information in response to a second memory access request.

20. The system of claim 19, wherein:

the controller device includes processing circuits configured to deactivate the chip select signal after receiving the first read data from the memory device and before receiving the second read data from the memory device, or deactivate the chip select signal after receiving the first read data and the second read data from the memory device.

\* \* \* \* \*